United States Patent
Si et al.

(10) Patent No.: US 11,818,592 B2
(45) Date of Patent: Nov. 14, 2023

(54) UPLINK SIGNAL TRANSMISSION METHOD AND DEVICE

(71) Applicant: VIVO MOBILE COMMUNICATION CO., LTD., Guangdong (CN)

(72) Inventors: Ye Si, Dongguan (CN); Peng Sun, Dongguan (CN); Xiaodong Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 285 days.

(21) Appl. No.: 17/356,807

(22) Filed: Jun. 24, 2021

(65) Prior Publication Data

US 2021/0329474 A1  Oct. 21, 2021

Related U.S. Application Data

(63) Continuation of application No. PCT/CN2019/105440, filed on Sep. 11, 2019.

(30) Foreign Application Priority Data

Dec. 28, 2018 (CN) .......................... 201811629804.2

(51) Int. Cl.
| | |
|---|---|
| *H04W 56/00* | (2009.01) |
| *H04W 16/28* | (2009.01) |
| *H04L 5/00* | (2006.01) |
| *H04L 25/02* | (2006.01) |
| *H04W 8/24* | (2009.01) |

(52) U.S. Cl.
CPC ........... *H04W 16/28* (2013.01); *H04L 5/0051* (2013.01); *H04L 25/0226* (2013.01); *H04W 8/24* (2013.01); *H04W 56/005* (2013.01)

(58) Field of Classification Search
CPC .. H04L 5/0051; H04L 25/0226; H04W 16/28; H04W 8/24; H04W 56/005
See application file for complete search history.

(56) References Cited

U.S. PATENT DOCUMENTS

| | | | |
|---|---|---|---|
| 2012/0129550 A1 | 5/2012 | Hannan et al. | |
| 2015/0110023 A1* | 4/2015 | Pan | H04W 52/04 370/329 |

(Continued)

FOREIGN PATENT DOCUMENTS

| | | |
|---|---|---|
| CN | 107872265 A | 4/2018 |
| CN | 108112076 A | 6/2018 |

(Continued)

OTHER PUBLICATIONS

First Office Action regarding Chinese Patent Application No. 201811629804.2, dated Dec. 16, 2021. Translation provided by Bohui Intellectual Property.

(Continued)

*Primary Examiner* — Fahmida S Chowdhury
(74) *Attorney, Agent, or Firm* — Harness, Dickey & Pierce, P.L.C.

(57) ABSTRACT

An uplink signal transmission method includes: transmitting a target uplink signal on the basis of a target transmission pattern, wherein the target transmission pattern is related to at least one of the uplink beamforming capability of a terminal device or the number of retransmissions of the target uplink signal.

20 Claims, 6 Drawing Sheets

(56) References Cited

U.S. PATENT DOCUMENTS

| | | |
|---|---|---|
| 2017/0264355 A1 | 9/2017 | Zhang et al. |
| 2018/0219606 A1 | 8/2018 | Ng et al. |
| 2018/0287860 A1 | 10/2018 | Xia et al. |
| 2019/0261340 A1* | 8/2019 | Tang ............... H04L 1/1614 |
| 2019/0268124 A1 | 8/2019 | Luo et al. |
| 2020/0014451 A1 | 1/2020 | Yang et al. |
| 2020/0022087 A1 | 1/2020 | Dou et al. |
| 2020/0107304 A1 | 4/2020 | Wang et al. |
| 2020/0213161 A1* | 7/2020 | Zhang ............... H04W 24/10 |
| 2021/0176094 A1* | 6/2021 | Kang ............... H04L 5/0094 |
| 2021/0282029 A1* | 9/2021 | Matsumura ........... H04W 72/21 |
| 2021/0314038 A1* | 10/2021 | Matsumura ......... H04B 7/0602 |
| 2021/0314062 A1* | 10/2021 | Kakishima ............ H04B 7/088 |
| 2021/0345390 A1* | 11/2021 | Okamura ............. H04W 72/23 |

FOREIGN PATENT DOCUMENTS

| | | |
|---|---|---|
| CN | 108377554 A | 8/2018 |
| CN | 108401295 A | 8/2018 |
| CN | 108631984 A | 10/2018 |
| CN | 108632971 A | 10/2018 |
| WO | WO-2018086434 A1 | 5/2018 |
| WO | WO-2018204340 A1 | 11/2018 |

OTHER PUBLICATIONS

"Potential techniques for NR positioning," Huawei, HiSilicon, 3GPP TSG RAN WG1 Meeting #95, R1-1812236, dated Nov. 16, 2018.

"Potential RAT-dependent techniques for NR Positioning," Nokia et al., 3GPP TSG RAN WG1 Meeting #95, R1-1813143, dated Nov. 16, 2018.

"SRS design for UL-based NR positioning evaluation," Huawei, HiSilicon, 3GPP TSG RAN WG1 Meeting #95, R1-1814270, dated Nov. 16, 2018.

"Considerations on Techniques for NR positioning," vivo, 3GPP TSG RAN WG1 Meeting #95, R1-1812337, dated Nov. 16, 2018.

International Search Report and Written Opinion of the International Searching Authority regarding International Patent Application No. PCT/CN2019/105440, dated Nov. 27, 2019. Translation provided by Bohui Intellectual Property.

* cited by examiner

A terminal device transmits a target uplink signal based on a target transmission pattern — S21

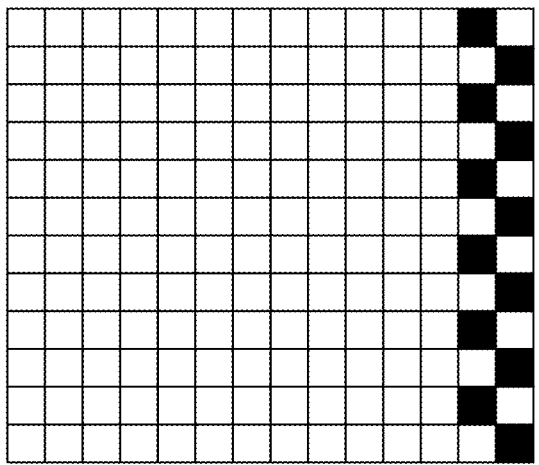
comb-2  X=2  Y=1  ■ Target uplink signal
5a
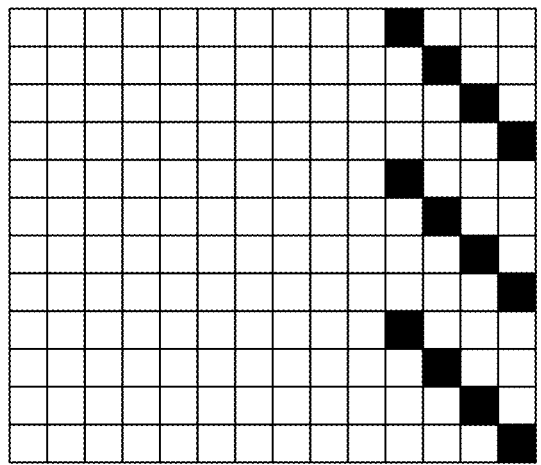
comb-4  X=4  Y=1  ■ Target uplink signal
5b
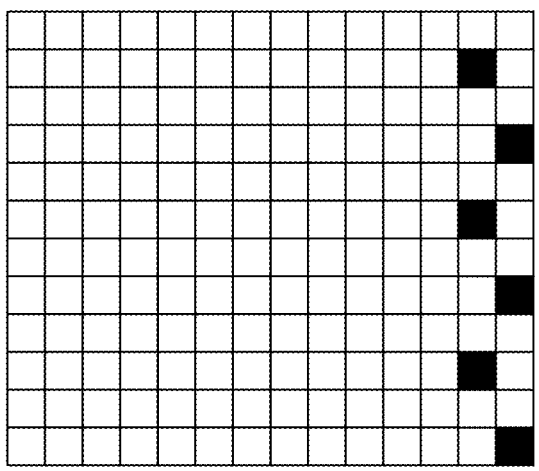
comb-4  X=2  Y=2  ■ Target uplink signal
5c
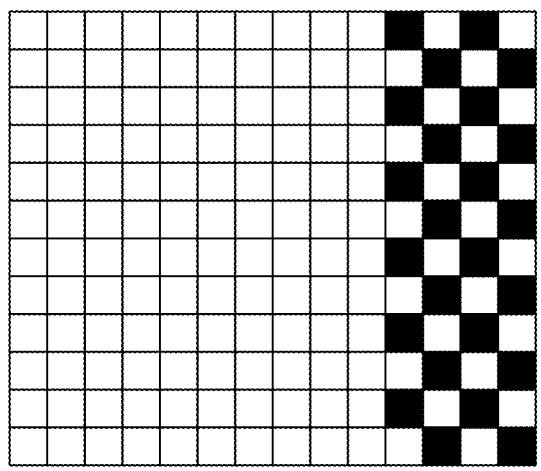
comb-2  X=4  Y=1  ■ Target uplink signal
5d
FIG. 5
A terminal device transmits a target uplink signal to a target cell or a target receiving apparatus through a target beam — S61
FIG. 6

| A terminal device transmits a target uplink signal | ~ S71 |

| A terminal device transmits a target uplink signal | ~ S81 |

UPLINK SIGNAL TRANSMISSION METHOD AND DEVICE

This application is a Bypass Continuation Application of PCT/CN2019/105440 filed on Sep. 11, 2019, which claims priority to Chinese Patent Application No. 201811629804.2 filed on Dec. 28, 2018, which are incorporated herein by reference in their entirety.

TECHNICAL FIELD

The present invention relates to the field of communications technologies, and in particular, to an uplink signal transmission method and a device.

BACKGROUND

Among services provided by terminal devices for users, many rely heavily on positioning a geographic location of a terminal device. For example, during navigation by using a terminal device, a geographic location of the terminal device needs to be obtained in real time. For another example, when a takeaway is being ordered through a terminal device, a geographic location of the terminal device needs to be first obtained to find merchants within a delivery range. Therefore, a positioning function of the terminal device is very important.

SUMMARY

According to a first aspect, an embodiment of the present invention provides an uplink signal transmission method, applied to a terminal device, where the method includes:

transmitting a target uplink signal based on a target transmission pattern, where the target transmission pattern is associated with at least one of an uplink beamforming capability of the terminal device or the number of repeated transmissions of the target uplink signal.

According to a second aspect, an embodiment of the present invention provides an uplink signal transmission method, applied to a terminal device, where the method includes:

transmitting a target uplink signal to a target cell or a target receiving apparatus through a target beam, where the target beam is a receiving beam of an optimal beam pair for a synchronization signal block (SSB) of the target cell or the target receiving apparatus; or the target beam is a receiving beam of one beam pair in a first beam pair set, and the first beam pair set is a set of beam pairs whose quality is better than a first quality threshold in beam pairs for a SSB of the target cell or the target receiving apparatus; or the target beam is a receiving beam of an optimal beam pair for a channel state information-reference signal (CSI-RS) of the target cell or the target receiving apparatus; or the target beam is a receiving beam of one beam pair in a second beam pair set, and the second beam pair set is a set of beam pairs whose quality is better than a second quality threshold in beam pairs for a CSI-RS of the target cell or the target receiving apparatus.

According to a third aspect, an embodiment of the present invention provides an uplink signal transmission method, applied to a terminal device, where the method includes:

transmitting a target uplink signal, where the target uplink signal is used for uplink positioning, and a modulation mode of a coded sequence of the target uplink signal is $\pi/2$–BPSK.

According to a fourth aspect, an embodiment of the present invention provides an uplink signal transmission method, applied to a terminal device, where the method includes:

transmitting a target uplink signal, where a time-frequency pattern of the target uplink signal is a target time-frequency pattern, and the target time-frequency pattern is determined by the terminal device based on a comb structure type of the target uplink signal, the number of symbols occupied by the target uplink signal in one slot, and a frequency domain offset between adjacent subcarriers.

According to a fifth aspect, an embodiment of the present invention provides an uplink signal transmission method, applied to a network side device, where the method includes:

receiving capability information from a terminal device, where the capability information includes the number of SRS resource sets supported by the terminal device and the number of SRS resources included in one SRS resource set; and transmitting first configuration information or indication information to the terminal device based on the capability information, where the first configuration information includes a target transmission pattern, and is used to indicate that the terminal device configures the target transmission pattern as a transmission pattern for transmitting a target uplink signal, the indication information is used to indicate that the terminal device determines the target transmission pattern in a predefined transmission pattern set as a transmission pattern for transmitting a target uplink signal, and the target transmission pattern is associated with the number of uplink SRS resource sets supported by the terminal device, the number of SRS resources included in one SRS resource set, and the number of repeated transmissions of the target uplink signal.

According to a sixth aspect, an embodiment of the present invention provides an uplink signal transmission method, applied to a network side device, where the method includes:

transmitting configuration information to a terminal device, where the configuration information is used to indicate that the terminal device transmits a target uplink signal to a target cell or a target receiving apparatus through a target beam; and the target beam is a receiving beam of an optimal beam pair for a synchronization signal block (SSB) of the target cell or the target receiving apparatus; or the target beam is a receiving beam of one beam pair in a first beam pair set, and the first beam pair set is a set of beam pairs whose quality is better than a first quality threshold in beam pairs for a SSB of the target cell or the target receiving apparatus; or the target beam is a receiving beam of an optimal beam pair for a CSI-RS of the target cell or the target receiving apparatus; or the target beam is a receiving beam of one beam pair in a second beam pair set, and the second beam pair set is a set of beam pairs whose quality is better than a second quality threshold in beam pairs for a CSI-RS of the target cell or the target receiving apparatus.

According to a seventh aspect, an embodiment of the present invention provides an uplink signal transmission method, applied to a network side device, where the method includes:

transmitting configuration information to a terminal device, where the configuration information is used to indicate that the terminal device performs π/2–BPSK modulation on a coded sequence of a target uplink signal; and the target uplink signal is a signal for uplink positioning.

According to an eighth aspect, an embodiment of the present invention provides an uplink signal transmission method, applied to a network side device, where the method includes:

transmitting configuration information to a terminal device, where the configuration information includes a comb structure type of a target uplink signal, the number of symbols occupied by the target uplink signal in one slot, and a frequency domain offset between adjacent subcarriers, and the configuration information is used to indicate that the terminal device determines a time-frequency pattern for transmitting the target uplink signal based on the comb structure type of the target uplink signal, the number of symbols occupied by the target uplink signal in one slot, and the frequency domain offset between adjacent subcarriers.

According to a ninth aspect, an embodiment of the present invention provides a terminal device, including:

a transmitting unit, configured to transmit a target uplink signal based on a target transmission pattern, where the target transmission pattern is associated with at least one of an uplink beamforming capability of the terminal device or the number of repeated transmissions of the target uplink signal.

According to a tenth aspect, an embodiment of the present invention provides a terminal device, including:

a transmitting unit, configured to transmit a target uplink signal to a target cell or a target receiving apparatus through a target beam, where the target beam is a receiving beam of an optimal beam pair for a SSB of the target cell or the target receiving apparatus; or the target beam is a receiving beam of one beam pair in a first beam pair set, and the first beam pair set is a set of beam pairs whose quality is better than a first quality threshold in beam pairs for a SSB of the target cell or the target receiving apparatus; or the target beam is a receiving beam of an optimal beam pair for a CSI-RS of the target cell or the target receiving apparatus; or the target beam is a receiving beam of one beam pair in a second beam pair set, and the second beam pair set is a set of beam pairs whose quality is better than a second quality threshold in beam pairs for a CSI-RS of the target cell or the target receiving apparatus.

According to an eleventh aspect, an embodiment of the present invention provides a terminal device, including:

a transmitting unit, configured to transmit a target uplink signal, where the target uplink signal is used for uplink positioning, and a modulation mode of a coded sequence of the target uplink signal is π/2–BPSK.

According to a twelfth aspect, an embodiment of the present invention provides a terminal device, including:

a transmitting unit, configured to transmit a target uplink signal, where a time-frequency pattern of the target uplink signal is a target time-frequency pattern, and the target time-frequency pattern is determined by the terminal device based on a comb structure type of the target uplink signal, the number of symbols occupied by the target uplink signal in one slot, and a frequency domain offset between adjacent subcarriers.

According to a thirteenth aspect, an embodiment of the present invention provides a network side device, including:

a receiving unit, configured to receive capability information from a terminal device, where the capability information includes the number of SRS resource sets supported by the terminal device and the number of SRS resources included in one SRS resource set; and a transmitting unit, configured to transmit first configuration information or indication information to the terminal device based on the capability information, where the first configuration information includes a target transmission pattern, and is used to indicate that the terminal device configures the target transmission pattern as a transmission pattern for transmitting a target uplink signal, the indication information is used to indicate that the terminal device determines the target transmission pattern in a predefined transmission pattern set as a transmission pattern for transmitting a target uplink signal, and the target transmission pattern is associated with the number of uplink SRS resource sets supported by the terminal device, the number of SRS resources included in one SRS resource set, and the number of repeated transmissions of the target uplink signal.

According to a fourteenth aspect, an embodiment of the present invention provides a network side device, including:

a transmitting unit, configured to transmit configuration information to a terminal device, where the configuration information is used to indicate that the terminal device transmits a target uplink signal to a target cell or a target receiving apparatus through a target beam; and the target beam is a receiving beam of an optimal beam pair for a SSB of the target cell or the target receiving apparatus; or the target beam is a receiving beam of one beam pair in a first beam pair set, and the first beam pair set is a set of beam pairs whose quality is better than a first quality threshold in beam pairs for a SSB of the target cell or the target receiving apparatus; or the target beam is a receiving beam of an optimal beam pair for a CSI-RS of the target cell or the target receiving apparatus; or the target beam is a receiving beam of one beam pair in a second beam pair set, and the second beam pair set is a set of beam pairs whose quality is better than a second quality threshold in beam pairs for a CSI-RS of the target cell or the target receiving apparatus.

According to a fifteenth aspect, an embodiment of the present invention provides a network side device, including:

a transmitting unit, configured to transmit configuration information to a terminal device, where the configuration information is used to indicate that the terminal device performs π/2–BPSK modulation on a coded sequence of a target uplink signal; and the target uplink signal is a signal for uplink positioning.

According to a sixteenth aspect, an embodiment of the present invention provides a network side device, including:

a transmitting unit, configured to transmit configuration information to a terminal device, where the configuration information includes a comb structure type of a target uplink signal, the number of symbols occupied by the target uplink signal in one slot, and a frequency domain offset between adjacent subcarriers, and the configuration information is used to indicate that the terminal device determines a time-frequency pattern for transmitting the target uplink signal based on the comb structure type of the target uplink signal, the number of symbols occupied by the target uplink signal in one slot, and the frequency domain offset between adjacent subcarriers.

According to a seventeenth aspect, an embodiment of the present invention provides a terminal device, including a processor, a memory, and a computer program stored in the memory and executable on the processor, where when the computer program is executed by the processor, the steps of the uplink signal transmission method according to any one of the first aspect, the second aspect, the third aspect, or the fourth aspect are implemented.

According to an eighteenth aspect, an embodiment of the present invention provides a network side device, including a processor, a memory, and a computer program stored in the memory and executable on the processor, where when the computer program is executed by the processor, the steps of the uplink signal transmission method according to any one of the fifth aspect, the sixth aspect, the seventh aspect, or the eighth aspect are implemented.

According to a nineteenth aspect, an embodiment of the present invention provides a non-transitory computer-readable storage medium, where the non-transitory computer-readable storage medium stores a computer program, and when the computer program is executed by a processor, the steps of the uplink signal transmission method according to any one of the first aspect to the ninth aspect are implemented.

BRIEF DESCRIPTION OF DRAWINGS

FIG. 5 is a schematic diagram of a target time-frequency transmission pattern according to an embodiment of the present invention;

FIG. 6 is a second flowchart of steps of an uplink signal transmission method according to an embodiment of the present invention;

DESCRIPTION OF EMBODIMENTS

Figures 1, 2:
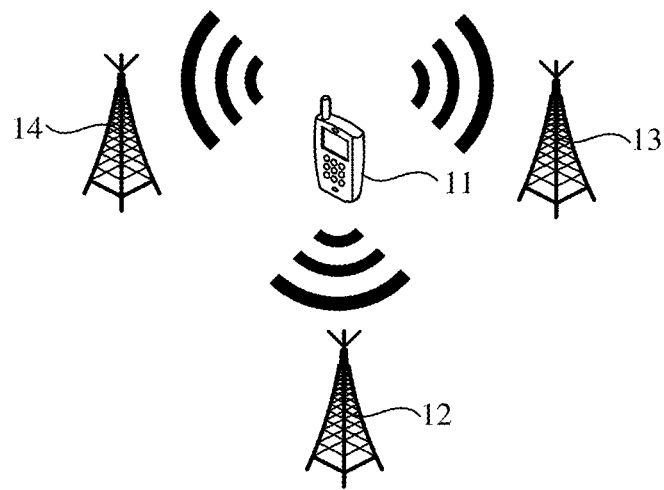
FIG. 1 is a possible schematic structural diagram of a communications system according to an embodiment of the present invention.
FIG. 2 is a first flowchart of steps of an uplink signal transmission method according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention shall fall within the protection scope of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects. In a formula, the character "/" represents a "divide" relationship between the associated objects. Unless otherwise specified, "a plurality of" in this specification indicates two or more than two.

To clearly describe the technical solutions of the embodiments of the present invention, terms such as "first" and "second" are used in the embodiments of the present invention to distinguish between same items or similar items that have basically the same functions or purposes. A person skilled in the art may understand that the terms such as "first" and "second" do not limit a quantity or an execution sequence.

In the embodiments of the present invention, the word such as "example" or "for example" is used to represent giving an example, an instance, or an illustration. Any embodiment or design solution described as "an example" or "for example" in the embodiments of the present invention shall not be interpreted to be more preferential or advantageous than other embodiments or design solutions. Specifically, the terms such as "an example" or "for example" are used to present related concepts in a specific manner. In the embodiments of the present invention, "plurality" indicates two or more, unless otherwise specified.

The technical solutions provided in this application can be applied to various communications systems, such as a 5G communications system, a future evolved system, or a plurality of communication fusion systems. A plurality of application scenarios may be included, such as machine to machine (M2M), D2M, macro-micro communications, enhanced mobile Internet (eMBB), ultra reliable and low latency communications (uRLLC), and massive machine type communications (mMTC). These scenarios include, but are not limited to, scenarios such as communication between terminal devices, communication between network side devices, or communication between a network side device and a terminal device. The embodiments of the present invention can be applied to communication between a network side device and a terminal device, or communication between terminal devices, or communication between network side devices in a 5G communications system.

In a long term evolution (LTE) network system, an uplink time difference of arrival is a commonly used uplink positioning technology. The positioning principle of uplink time difference of arrival is: measuring, by using a plurality of location measurement units (LMU), an uplink positioning reference signal transmitted by a terminal device, and then calculating position coordinates of the terminal device by using a plurality of reference signal time difference (RSTD) measurement quantities. At present, new radio (NR) network systems have already supported uplink positioning, which means that a terminal device needs to transmit an uplink signal. However, with the characteristics of NR network systems and the requirements of NR network systems for positioning considered, the method of transmitting an uplink positioning reference signal by a terminal device in LTE network systems cannot be applied to NR network systems. Therefore, how a terminal device transmits an uplink signal in an NR network system needs an urgent solution.

FIG. 1 is a possible schematic structural diagram of a communications system used in an embodiment of the present invention. As shown in FIG. 1, the communications system may include: a terminal device 11 and a plurality of network side devices (FIG. 1 shows an example of three network side devices, including a network side device 12, a network side device 13, and a network side device 14).

The terminal device 11 may be in a connected state. In other words, the terminal device may establish radio resource control (RRC) with one or more network side devices, and all parameters required for communication are known to the terminal device and the network side devices. The terminal device 11 may alternatively be in an inactive state. In other words, a context between a network side and a terminal device is maintained, so that the terminal device is in a connected state from the perspective of the network side, and the terminal device is also allowed to reduce power consumption in a way like an idle state. The terminal device 11 may alternatively be in an idle state. In other words, the terminal device has no context on a network side, parameters required for communication between the network side and the terminal device do not belong to a specified cell, and the network side does not know whether the terminal device exists.

Optionally, the network side device may be a base station, a core network device, a transmission and reception point (TRP), a relay station, an access point, a location measurement unit (LMU), or the like. The network side device may be a base transceiver station (BTS) in a global system for mobile communications (GSM) or a code division multiple access (CDMA) network, may be an NB (NodeB) in wideband code division multiple access (WCDMA), or may be a gNB in NR or a network side device in a future evolution network. The network side device may alternatively be a wireless controller in a cloud radio access network (CRAN) scenario.

The terminal device 11 may be a wireless terminal device. The wireless terminal device may be a device that provides voice and/or other service data connectivity to a user, a handheld device having a wireless communication function, a computing device or other processing devices connected to a wireless modem, an in-vehicle device, a wearable device, a terminal device in a future 5G network or a terminal device in a future evolved PLMN network, or the like. The wireless terminal device may communicate with one or more core networks through a radio access network (RAN). The wireless terminal device may be a mobile terminal, such as a mobile phone (also referred to as a "cellular" phone) and a computer that is provided with a mobile terminal, for example, may be a portable mobile apparatus, a pocket-sized mobile apparatus, a handheld mobile apparatus, a computer built-in mobile apparatus, or an in-vehicle mobile apparatus that exchanges voice and/or data with the radio access network, and a device such as a personal communications service (PCS) phone, a cordless telephone set, a session initiation protocol (SIP) phone, a wireless local loop (WLL) station, or a personal digital assistant (PDA). The wireless terminal device may also be a mobile device, a UE terminal, an access terminal, a wireless communications device, a terminal unit, a terminal station, a mobile station, a mobile console, a remote station, a remote terminal unit, a remote terminal, a subscriber unit, a subscriber station, a user agent, or a terminal apparatus. For example, in this embodiment of the present invention, FIG. 1 shows a mobile phone as an example of a terminal device.

It should also be noted that although in FIG. 1, the communications system to which the uplink signal transmission method provided in this embodiment of the present invention is applied includes three network side devices, the embodiments of the present invention are not limited thereto, and the communications system to which the uplink signal transmission method provided in this embodiment of the present invention is applied may also include other numbers of network side devices. In this embodiment of the present invention, the number of network side devices included in the communications system to which the uplink signal transmission method is applied is not limited.

An embodiment of the present invention provides an uplink signal transmission method, applied to a terminal device. FIG. 2 is a schematic flowchart of the uplink signal transmission method provided in this embodiment of the present invention. As shown in FIG. 2, the uplink signal transmission method may include the following steps:

S21: The terminal device transmits a target uplink signal based on a target transmission pattern.

The target transmission pattern is associated with at least one of an uplink beamforming capability of the terminal device or the number of repeated transmissions of the target uplink signal.

In other words, the target transmission pattern is associated with the uplink beamforming capability of the terminal device and/or the number of repeated transmissions of the target uplink signal.

Certainly, on the basis of the foregoing embodiment, the target transmission pattern may also be associated with other conditions, which is not limited in the embodiments of the present invention.

Optionally, the uplink beamforming capability of the terminal device includes: whether the terminal device supports uplink beamforming, and in a case that the terminal device supports beamforming, the number of uplink SRS resource sets supported by the terminal device, and the number of SRS resources included in one SRS resource set.

For example, the number of repeated transmissions of the target uplink signal may be configured by a network side device for the terminal device based on a coverage capability of the network side device that receives the target uplink signal.

In other words, the number of repeated transmissions of the target uplink signal is associated with the coverage capability of the network side device.

For example, the uplink beamforming capability of the terminal device may be that the terminal device does not support uplink beamforming.

When the terminal device does not support uplink beamforming, the target transmission pattern is an omnidirectional transmission pattern.

For example, the uplink beamforming capability of the terminal device may be that: the terminal device supports uplink beamforming, the number of supported uplink sounding reference signal SRS resource sets (Maximum number of SRS resource sets supported by the UE) is K and the number of SRS resources included in one SRS resource set (Maximum number of SRS resources per SRS resource set supported by the UE) is L, which can be obtained from a capability parameter of UE, uplink Beam Management.

For example, the uplink beamforming capability of the terminal device may be that: the terminal device supports uplink beamforming, the number of supported uplink SRS resource sets supported by the terminal device is K, and the number of SRS resources included in one SRS resource set is L.

In a case that the terminal device supports uplink beamforming, the number of supported uplink SRS resource sets is X, and the number of SRS resources included in one SRS resource set is Y, the target transmission pattern may be a beam pattern.

Optionally, the target uplink signal includes at least one of an uplink SRS, a physical random access channel (PRACH), an uplink positioning reference signal (UL PRS), or a target signal.

The target signal is a signal defined for uplink positioning in a NR network.

In other words, when the foregoing embodiment is applied to an NR network system, the target uplink signal may be at least one of an NR SRS, an NR PRACH, an NR UL PRS, or a newly defined NR uplink signal.

Optionally, the following describes in detail the implementation scheme of the target transmission pattern in the foregoing embodiment when the terminal device supports uplink beamforming, the number of supported uplink SRS resource sets is K, and the number of SRS resources included in one SRS resource set is L.

Scheme 1

Figure 3:
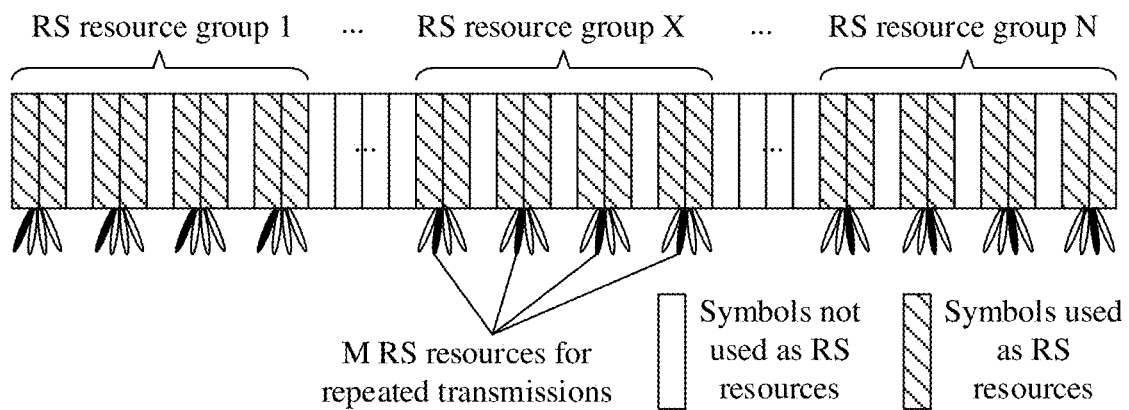
FIG. 3 is a first schematic diagram of a target transmission pattern according to an embodiment of the present invention.

Referring to FIG. 3, the target transmission pattern includes N reference signal (RS) resource groups, and each RS resource group includes M RS resources.

N is a product of the number of SRS resource sets and the number of SRS resources included in one SRS resource set, and M is the number of repeated transmissions of the target uplink signal.

In other words, the target transmission pattern may be divided into N consecutive RS resource groups, and each RS resource group has M RSs. N corresponds to the number of RS resources supported by the terminal device (N=number of SRS resource sets that the terminal device can support× number of SRS resources included in one SRS resource set, or N=K×L), and M is the number of repeated transmissions of the target uplink signal.

Optionally, when the number of repeated transmissions of the target uplink signal is greater than 1, a transmission sequence of repeated target uplink signal is successive.

In other words, if the target uplink signal requires repeated transmission, a transmission sequence on RS resources for transmitting the target uplink signal requiring repeated transmission is successive.

Optionally, M RS resources in one RS resource group correspond to a same transmission beam.

Transmission beams corresponding to any two RS resource groups in the target transmission pattern are different, and a transmission beam corresponding to a RS resource group is a transmission beam corresponding to RS resources in the RS resource group.

In other words, each of the N groups of different RS resources uses a different beam to transmit the target uplink signal.

Optionally, all RS resources in the target transmission pattern have a same transmission power.

In addition, it should be noted that transmission powers of all the RS resources may vary, but the transmission powers of all the RS resources are the same.

Scheme 2

Figure 4:
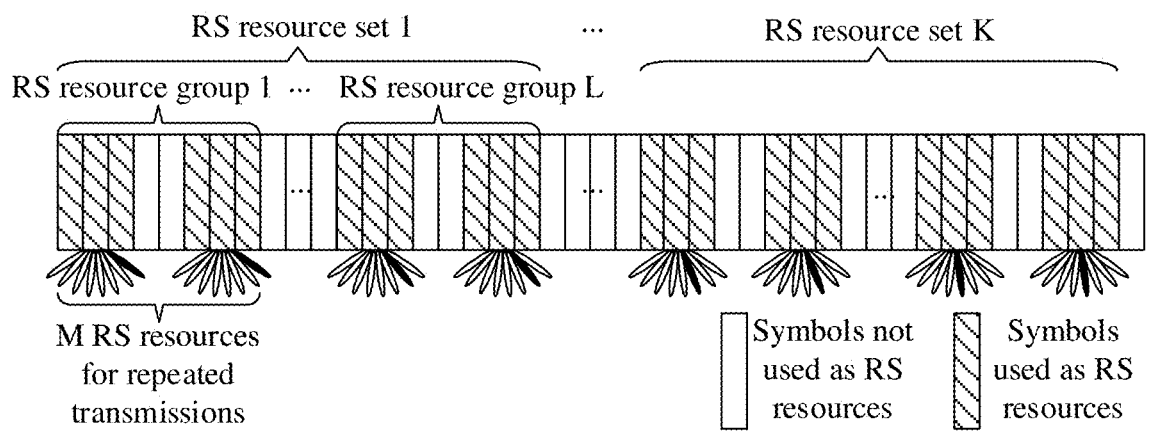
FIG. 4 is a second schematic diagram of a target transmission pattern according to an embodiment of the present invention.

Referring to FIG. 4, the target transmission pattern includes K RS resource sets, each RS resource set includes L RS resource groups, and each RS resource group includes M RS resources.

K is the number of SRS resource sets supported by the terminal device, L is the number of SRS resources included in one SRS resource set, and M is the number of repeated transmissions of the target uplink signal.

In other words, the target transmission pattern may be divided into K RS resource sets, where K is the number of SRS resource sets supported by the terminal device; there are L RS resource groups in each large set, where L is the number of SRS resources in one SRS resource set; and M RS resources in each RS resource group transmit the same target uplink signal.

Optionally, when the number of repeated transmissions of the target uplink signal is greater than 1, a transmission sequence of repeated target uplink signal is successive.

In other words, if the target uplink signal requires repeated transmission, a transmission sequence on RS resources for transmitting the target uplink signal requiring repeated transmission is successive.

Optionally, M RS resources in one RS resource group correspond to a same transmission beam.

Transmission beams corresponding to any two RS resource groups in the target transmission pattern are different, and a transmission beam corresponding to a RS resource group is a transmission beam corresponding to RS resources in the RS resource group.

In other words, each of the N groups of different RS resources uses a different beam to transmit the target uplink signal.

Optionally, all RS resources in the target transmission pattern have a same transmission power.

In addition, it should be noted that transmission powers of all the RS resources may vary, but the transmission powers of all the RS resources are the same.

Optionally, the following describes in detail the implementation of determining the target transmission pattern by the terminal device in the foregoing embodiment.

Manner 1:

Optionally, before the transmitting the target uplink signal based on the target transmission pattern, the method further includes the following steps a to c.

Step a: The terminal device transmits capability information to a network side device.

Correspondingly, the network side device receives the capability information transmitted by the terminal device.

The capability information includes the number of SRS resource sets supported by the terminal device and the number of SRS resources included in one SRS resource set.

Step b: The network side device transmits first configuration information to the terminal device.

Correspondingly, the terminal device receives the first configuration information transmitted by the network side device.

The first configuration information includes the target transmission pattern, and is used to indicate that the terminal device configures the target transmission pattern as a transmission pattern for transmitting the target uplink signal.

Step c: The terminal device configures the target transmission pattern as the transmission pattern for transmitting the target uplink signal.

In other words, based on the capability information reported by the terminal device (including the number of supported SRS resource sets and the number of SRS resources included in one SRS resource set) and a coverage capability of the network side device, the network side device may directly configure, through higher layer signaling, a transmission pattern for the terminal device to transmit the target uplink signal.

Manner 2:

Optionally, before the transmitting the target uplink signal based on the target transmission pattern, the method further includes the following steps I to III.

Step I: The terminal device transmits capability information to a network side device.

Correspondingly, the network side device receives the capability information transmitted by the terminal device.

The capability information includes the number of SRS resource sets supported by the terminal device and the number of SRS resources included in one SRS resource set.

Step II: The network side device transmits indication information to the terminal device.

Correspondingly, the terminal device receives the indication information transmitted by the network side device.

The indication information is used to indicate that the terminal device determines the target transmission pattern in a predefined transmission pattern set as a transmission pattern for transmitting the target uplink signal.

For example, the indication information may carry RRC information, a media access control-control element (MAC CE), and downlink control information (DCI).

Step III: The terminal device configures the target transmission pattern as the transmission pattern for transmitting the target uplink signal.

In other words, a plurality of transmission patterns may be pre-defined, and the network side device may transmit the indication information based on the capability information reported by the terminal device (including the number of supported SRS resource sets and the number of SRS resources included in one SRS resource set) and a coverage capability of the network side device to indicate that the terminal device selects one of the plurality of predefined transmission patterns to transmit the target uplink signal.

Optionally, the following describes in detail the configuration scheme for the transmission power of the target uplink signal in the foregoing embodiment when the terminal device is in an inactive state or an idle state.

Scheme 1

Optionally, when the terminal device is in an idle state or an inactive state, the method further includes the following steps a and b.

Step a: Before completion of connected state release for the terminal device, a network side device transmits second configuration information to the terminal device.

Correspondingly, before completion of connected state release, the terminal device receives, from the network side device, the second configuration information including a target power.

The second configuration information includes the target power, and is used to indicate that the terminal device configures the target power as a transmission power of the target uplink signal.

Step b: The terminal device configures the target power as the transmission power of the target uplink signal.

In other words, the network side device configures the transmission power of the target uplink signal for the terminal device, where the transmission power of the target uplink signal is configured as a constant value and does not vary with a camp cell of the terminal device.

Scheme 2

Optionally, when the terminal device is in an idle state or an inactive state, the method further includes the following steps a and b.

Step a: Before completion of connected state release for the terminal device, a network side device transmits third configuration information to the terminal device.

Correspondingly, before completion of connected state release, the terminal device receives the third configuration information from the network side device.

The third configuration information is used to indicate that the terminal device determines a transmission power of the target uplink signal based on a camp cell.

Step b: The terminal device determines the transmission power of the target uplink signal based on the camp cell.

In other words, the terminal device may determine different transmission powers of the target uplink signal based on different camp cells, and when a camp cell of the terminal device changes, the terminal device updates a transmission power of the target uplink signal based on a new camp cell.

For example, the determining the transmission power of the target uplink signal based on the camp cell may be:

determining the transmission power of the target uplink signal based on an association relationship between reference signal received powers (RSRP) of a group of camp cells and transmission powers of the target uplink signal.

For example, the terminal device may select the corresponding transmission power of the target uplink signal based on a RSRP of a camp cell. Certainly, on the basis of the foregoing embodiment, those skilled in the art may also determine the transmission power of the target uplink signal in other ways, and the embodiments of the present invention are not limited to the configuration scheme for the transmission power of the target uplink signal provided in the foregoing embodiment.

In addition, it should be noted that the RSRP of the camp cell may be calculated based on an SSB. Certainly, the RSRP of the camp cell may also be obtained in other ways, which is not limited in this embodiment of the present invention.

Optionally, the following describes in detail the configuration scheme for a timing advance (TA) of the target uplink signal in the foregoing embodiment when the terminal device is in an inactive state or an idle state.

Optionally, when the terminal device is in an idle state or an inactive state, the method further includes the following steps a and b.

Step a: Before completion of connected state release for the terminal device, a network side device transmits fourth configuration information to the terminal device.

Correspondingly, before completion of connected state release, the terminal device receives the fourth configuration information from the network side device.

The fourth configuration information includes a target TA, and the fourth configuration information is used to indicate that the terminal device configures a TA of the target uplink signal as the target TA.

Step b: The terminal device configures the TA of the target uplink signal as the target TA.

In other words, the TA of the target uplink signal may be configured by the network side device for the terminal device.

Optionally, the target TA is 0.

Optionally, the following describes in detail the configuration scheme for a reference timing of the target uplink signal in the foregoing embodiment when the terminal device is in an inactive state or an idle state.

Scheme 1

Optionally, when the terminal device is in an idle state or an inactive state, the method further includes the following steps a and b.

Step a: Before completion of connected state release for the terminal device, a network side device transmits fifth configuration information to the terminal device.

Correspondingly, before completion of connected state release, the terminal device receives the fifth configuration information from the network side device.

The fifth configuration information is used to indicate that the terminal device determines a timing of a target cell to be a reference timing of the target uplink signal; and the target cell is a camp cell of the terminal device.

Step b: The terminal device determines the timing of the target cell to be the reference timing of the target uplink signal.

In other words, the terminal device may select a timing of a current camp cell to be the reference timing of the target uplink signal.

Scheme 2

Optionally, when the terminal device is in an idle state or an inactive state, the method further includes the following steps a and b.

Step a: Before completion of connected state release for the terminal device, a network side device transmits fifth configuration information to the terminal device.

Correspondingly, before completion of connected state release, the terminal device receives the fifth configuration information from the network side device.

The fifth configuration information is used to indicate that the terminal device determines a timing of a target cell to be a reference timing of the target uplink signal; and the target cell is a cell closest to the terminal device among cells adjacent to a camp cell of the terminal device.

Step b: The terminal device determines the timing of the target cell to be the reference timing of the target uplink signal.

In other words, the terminal device may select a timing of a cell closest to the terminal device among a plurality of adjacent cells to be the reference timing of the uplink reference signal.

Optionally, a modulation mode of a coded sequence of the target uplink signal is $\pi/2$-BPSK.

Compared with modulation by using Zadoff-Chu (ZC), the modulation mode of the coded sequence of the target uplink signal is $\pi/2$-BPSK, which can make the target uplink signal have better peak-to-average power ratio (PAPR) performance, and is beneficial to hearability of a network side receiving device at a farther distance.

In addition, the modulation mode of the coded sequence of the target uplink signal may be configured by the network side device for the terminal device.

Optionally, a time-frequency pattern of the target uplink signal is a target time-frequency pattern.

The target time-frequency pattern is determined by the terminal device based on a comb structure type of the target uplink signal, the number of symbols occupied by the target uplink signal in one slot, and a frequency domain offset between adjacent subcarriers.

For example, referring to FIG. 5, when the comb structure type of the target uplink signal is comb-2, the number X of symbols occupied by the target uplink signal in one slot is 2, and the frequency domain offset Y between adjacent subcarriers is 1, the target time-frequency pattern is shown in 5a of FIG. 5. When the comb structure type of the target uplink signal is comb-4, the number X of symbols occupied by the target uplink signal in one slot is 4, and the frequency domain offset Y between adjacent subcarriers is 1, the target time-frequency pattern is shown in 5b of FIG. 5. When the comb structure type of the target uplink signal is comb-4, the number X of symbols occupied by the target uplink signal in one slot is 2, and the frequency domain offset Y between adjacent subcarriers is 2, the target time-frequency pattern is shown in 5c of FIG. 5. When the comb structure type of the target uplink signal is comb-2, the number X of symbols occupied by the target uplink signal in one slot is 4, and the frequency domain offset Y between adjacent subcarriers is 1, the target time-frequency pattern is shown in 5d of FIG. 5.

The comb structure type of the target uplink signal, the number of symbols occupied by the target uplink signal in one slot, and the frequency domain offset between adjacent subcarriers in the foregoing embodiment may be configured by the network side device for the terminal device.

Optionally, an embodiment of the present invention provides an uplink signal transmission method. Referring to FIG. 6, the method includes the following steps.

S61: A terminal device transmits a target uplink signal to a target cell or a target receiving apparatus through a target beam.

The target beam is a receiving beam of an optimal beam pair for a SSB of the target cell or the target receiving apparatus; or the target beam is a receiving beam of one beam pair in a first beam pair set, and the first beam pair set is a set of beam pairs whose quality is better than a first quality threshold in beam pairs for a SSB of the target cell or the target receiving apparatus; or the target beam is a receiving beam of an optimal beam pair for a CSI-RS of the target cell or the target receiving apparatus; or the target beam is a receiving beam of one beam pair in a second beam pair set, and the second beam pair set is a set of beam pairs whose quality is better than a second quality threshold in beam pairs for a CSI-RS of the target cell or the target receiving apparatus.

In the uplink signal transmission method provided in this embodiment of the present invention, the terminal device transmits the target uplink signal to the target cell or the target receiving apparatus through the target beam, where the target beam is a receiving beam of an optimal beam pair for a SSB of the target cell or the target receiving apparatus, or the target beam is a receiving beam of one beam pair in a first beam pair set, or the target beam is a receiving beam of an optimal beam pair for a CSI-RS of the target cell or the target receiving apparatus, or the target beam is a receiving beam of one beam pair in a second beam pair set. In other words, the target uplink signal may be transmitted through the receiving beam in the optimal beam pair for the SSB of the target cell or the target receiving apparatus, or the receiving beam of the beam pair whose quality is better than the first quality threshold in the beam pairs for the SSB of the target cell or the target receiving apparatus, or the receiving beam in the optimal beam pair for the CSI-RS of the target cell or the target receiving apparatus, or the receiving beam of the beam pair whose quality is better than the second quality threshold in the beam pairs for the CSI-RS of the target cell or the target receiving apparatus. Therefore, this embodiment of the present invention provides an implementation in which a terminal device can transmit an uplink signal in an NR network system, to resolve a problem of how the terminal device transmits the uplink signal in the NR network system.

Optionally, the target uplink signal includes an uplink signal for uplink positioning.

Optionally, the target uplink signal includes at least one of an uplink SRS, a PRACH, an UL PRS, or a target signal.

The target signal is a signal defined for uplink positioning in a NR network.

Optionally, the following describes in detail the configuration scheme of the target beam in the foregoing embodiment.

Optionally, before step S61 (transmitting a target uplink signal to a target cell or a target receiving apparatus through a target beam), the method further includes the following steps a and b.

Step a: A network side device transmits configuration information to the terminal device.

Correspondingly, the terminal device receives the configuration information transmitted by the network side device.

The configuration information is used to indicate that the terminal device transmits a target uplink signal through a receiving beam to a target cell or a target receiving apparatus, and the target beam is a receiving beam of an optimal beam pair for a SSB of the target cell or the target receiving apparatus, or the target beam is a receiving beam of one beam pair in a first beam pair set, where the first beam pair set is a set of beam pairs whose quality is better than a first quality threshold in beam pairs for the SSB of the target cell or the target receiving apparatus; or the target beam is a receiving beam of an optimal beam pair for a CSI-RS of the target cell or the target receiving apparatus, or the target beam is a receiving beam of one beam pair in a second beam pair set, where the second beam pair set is a set of beam pairs whose quality is better than a second quality threshold in beam pairs for the CSI-RS of the target cell or the target receiving apparatus.

Step b: The terminal device determines the target beam based on the configuration information.

Optionally, a modulation mode of a coded sequence of the target uplink signal is π/2-BPSK.

Compared with modulation by using ZC, the modulation mode of the coded sequence of the target uplink signal is π/2-BPSK, which can make the target uplink signal have better PAPR performance, and is beneficial to hearability of a specific network side receiving device.

In addition, the modulation mode of the coded sequence of the target uplink signal may be configured by the network side device for the terminal device.

Optionally, a time-frequency pattern of the target uplink signal is a target time-frequency pattern.

The target time-frequency pattern is determined by the terminal device based on a comb structure type of the target uplink signal, the number of symbols occupied by the target uplink signal in one slot, and a frequency domain offset between adjacent subcarriers.

Figures 7, 8, 9:
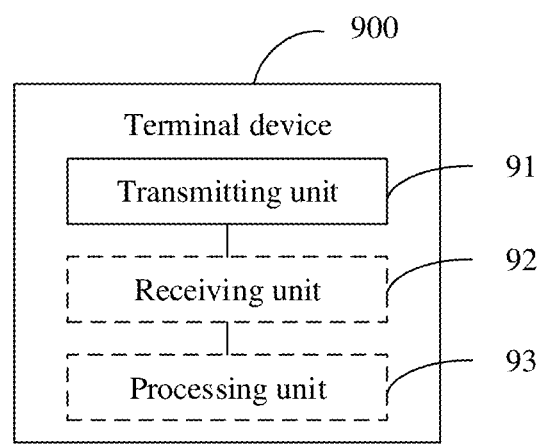
FIG. 7 is a third flowchart of steps of an uplink signal transmission method according to an embodiment of the present invention.
FIG. 8 is a fourth flowchart of steps of an uplink signal transmission method according to an embodiment of the present invention.
FIG. 9 is a schematic structural diagram of a terminal device according to an embodiment of the present invention.

Another embodiment of the present invention provides an uplink signal transmission method. Referring to FIG. 7, the uplink signal transmission method includes the following steps.

S71: A terminal device transmits a target uplink signal.

The target uplink signal is used for uplink positioning, and a modulation mode of a coded sequence of the target uplink signal is π/2-BPSK.

In the foregoing embodiment, the modulation mode of the coded sequence of the target uplink signal that is transmitted by the terminal device and that is used for uplink positioning is π/2-BPSK, which can make the target uplink signal have better PAPR performance, and is beneficial to hearability of a specific network side receiving device.

For example, the coded sequence b(i) of the target uplink signal may be a gold sequence, an m sequence, or a computer generated sequence, where a generation parameter of the gold sequence or the m sequence may be calculated based on a user equipment-user equipment group identity (UE/UE group ID) or an ID configured by a network. The UE/UE group ID may be calculated based on an international mobile subscriber identification number (IMSI) or an international mobile equipment identity (IMEI), or obtained through an indication from the network side device.

After the coded sequence b(i) of the target uplink signal is obtained, π/2-BPSK modulation is performed to generate a π/2-BPSK modulation sequence d(i) of the target uplink signal.

For example, $$d(i) = \frac{e^{j\frac{\pi}{2}(i \bmod 2)}}{\sqrt{2}}[(1 - 2b(i)) + j(1 - 2b(i))].$$

After the π/2-BPSK modulation sequence d(i) of the target uplink signal is obtained, discrete Fourier transform (DFT) is performed on d(i) to obtain a frequency domain sequence z(i), and finally, the frequency domain sequence z(i) is mapped to an orthogonal frequency division multiplexing (OFDM) resource grid.

Optionally, before step S71 (transmitting a target uplink signal), the method further includes the following steps a and b.

Step a: A network side device transmits configuration information to the terminal device.

Correspondingly, the terminal device receives the configuration information transmitted by the network side device.

The configuration information is used to indicate that the terminal device performs π/2-BPSK modulation on a coded sequence of a target uplink signal; and the target uplink signal is a signal for uplink positioning.

Step b: The terminal device performs π/2-BPSK modulation on the coded sequence of the target uplink signal based on the configuration information.

Optionally, a time-frequency pattern of the target uplink signal is a target time-frequency pattern.

The target time-frequency pattern is determined by the terminal device based on a comb structure type of the target uplink signal, the number of symbols occupied by the target uplink signal in one slot, and a frequency domain offset between adjacent subcarriers.

Optionally, the target uplink signal includes at least one of an uplink SRS, a PRACH, an UL PRS, or a target signal.

The target signal is a signal defined for uplink positioning in a new radio NR network.

Still another embodiment of the present invention provides an uplink signal transmission method. Referring to FIG. 8, the uplink signal transmission method includes the following steps.

S81: A terminal device transmits a target uplink signal.

A time-frequency pattern of the target uplink signal is a target time-frequency pattern, and the target time-frequency pattern is determined by the terminal device based on a comb structure type of the target uplink signal, the number of symbols occupied by the target uplink signal in one slot, and a frequency domain offset between adjacent subcarriers.

In this embodiment of the present invention, the terminal device transmits the target uplink signal whose time-frequency pattern is the target time-frequency pattern, where the target time-frequency pattern is determined by the terminal device based on the comb structure type of the target uplink signal, the number of symbols occupied by the target uplink signal in one slot, and the frequency domain offset between adjacent subcarriers. Therefore, this embodiment of the present invention provides an implementation in which a terminal device can transmit an uplink signal in an NR network system, to resolve a problem of how the terminal device transmits the uplink signal in the NR network system.

Optionally, the target uplink signal includes an uplink signal for uplink positioning.

Optionally, the target uplink signal includes at least one of an uplink SRS, a PRACH, an UL PRS, or a target signal.

The target signal is a signal defined for uplink positioning in a NR network.

Optionally, before step S81 (transmitting a target uplink signal), the method further includes the following steps a and b.

Step a: A network side device transmits configuration information to the terminal device.

Correspondingly, the terminal device receives the configuration information transmitted by the network side device.

The configuration information includes a comb structure type of a target uplink signal, the number of symbols occupied by the target uplink signal in one slot, and a frequency domain offset between adjacent subcarriers, and the configuration information is used to indicate that the terminal device determines a time-frequency pattern for transmitting the target uplink signal based on the comb structure type of the target uplink signal, the number of symbols occupied by the target uplink signal in one slot, and the frequency domain offset between adjacent subcarriers.

Step b: The terminal device determines the target time-frequency pattern based on the comb structure type of the target uplink signal, the number of symbols occupied by the target uplink signal in one slot, and the frequency domain offset between adjacent subcarriers.

In some embodiments of the present invention, functional module division may be performed for the terminal device and the like based on the foregoing method examples. For example, functional modules may be obtained through division in one-to-one correspondence with functions, or two or more functions may be integrated into one module. The integrated module may be implemented in a form of hardware, or may be implemented in a form of a software functional module. It should be noted that, the module division in some embodiments of the present invention is an example and is merely logical function division. There may be another division manner in actual implementation.

When an integrated unit is used, FIG. 9 is a possible schematic structural diagram of a terminal device 900 in the foregoing embodiments. The terminal device 900 includes:

a transmitting unit 91, configured to transmit a target uplink signal based on a target transmission pattern, where the target transmission pattern is associated with at least one of an uplink beamforming capability of the terminal device or the number of repeated transmissions of the target uplink signal.

Optionally, the uplink beamforming capability of the terminal device includes: whether the terminal device supports uplink beamforming, and in a case that the terminal device supports beamforming, the number of uplink SRS resource sets supported by the terminal device, and the number of SRS resources included in one SRS resource set.

Optionally, the target uplink signal includes an uplink signal for uplink positioning.

Optionally, referring to FIG. 9, the terminal device further includes a receiving unit 92 and a processing unit 93.

The transmitting unit 91 is further configured to transmit capability information to a network side device, where the capability information includes the number of SRS resource sets supported by the terminal device and the number of SRS resources included in one SRS resource set.

The receiving unit 92 is configured to receive first configuration information including a target transmission pattern from the network side device.

The processing unit 93 is configured to configure the target transmission pattern as a transmission pattern for transmitting the target uplink signal.

Optionally, referring to FIG. 9, the terminal device further includes a receiving unit and a processing unit.

The transmitting unit 91 is further configured to transmit capability information to a network side device, where the capability information includes the number of SRS resource sets supported by the terminal device and the number of SRS resources included in one SRS resource set.

The receiving unit 92 is further configured to receive indication information from the network side device.

The processing unit 93 is configured to determine the target transmission pattern in a predefined transmission pattern set based on the indication information, and configure the target transmission pattern as a transmission pattern for transmitting the target uplink signal.

Optionally, the target transmission pattern includes N RS resource groups, and each RS resource group includes M RS resources, where N is a product of the number of SRS resource sets supported by the terminal device and the number of SRS resources included in one SRS resource set, and M is the number of repeated transmissions of the target uplink signal.

Optionally, the target transmission pattern includes K RS resource sets, each RS resource set includes L RS resource groups, and each RS resource group includes M RS resources, where K is the number of SRS resource sets supported by the terminal device, L is the number of SRS resources included in one SRS resource set, and M is the number of repeated transmissions of the target uplink signal.

Optionally, when the number of repeated transmissions of the target uplink signal is greater than 1, a transmission sequence of repeated target uplink signal is successive.

Optionally, M RS resources in one RS resource group correspond to a same transmission beam.

Transmission beams corresponding to any two RS resource groups in the target transmission pattern are different, and a transmission beam corresponding to a RS resource group is a transmission beam corresponding to RS resources in the RS resource group.

Optionally, all RS resources in the target transmission pattern have a same transmission power.

Optionally, referring to FIG. 9, the terminal device further includes a receiving unit 92 and a processing unit 93.

When the terminal device is in an idle state or in an inactive state, before completion of connected state release, the receiving unit 92 is configured to receive, from the network side device, second configuration information including a target power.

The processing unit 93 is configured to configure the target power as a transmission power of the target uplink signal.

Optionally, referring to FIG. 9, the terminal device further includes a receiving unit 92 and a processing unit 93.

When the terminal device is in an idle state or in an inactive state, the receiving unit 92 is configured to receive, before completion of connected state release for the terminal device, third configuration information from the network side device, where the third configuration information is used to indicate that the terminal device determines a transmission power of the target uplink signal based on a camp cell.

The processing unit 93 is configured to determine a transmission power of the target uplink signal based on the camp cell.

Optionally, referring to FIG. 9, the terminal device further includes a receiving unit 92 and a processing unit 93.

When the terminal device is in an idle state or in an inactive state, the receiving unit 92 is configured to receive, before completion of connected state release, fourth configuration information from the network side device, where the fourth configuration information includes a target TA.

The processing unit 93 is configured to configure a TA of the target uplink signal as the target TA.

Optionally, the target TA is 0.

Optionally, referring to FIG. 9, the terminal device further includes a receiving unit 92 and a processing unit 93.

When the terminal device is in an idle state or in an inactive state, the receiving unit 92 is configured to receive, before completion of connected state release for the terminal device, fifth configuration information from the network side device, where the fifth configuration information is used to indicate that the terminal device determines a timing of a target cell to be a reference timing of the target uplink signal.

The processing unit 93 is configured to determine the timing of the target cell to be the reference timing of the target uplink signal.

The target cell is a camp cell of the terminal device; or the target cell is a cell closest to the terminal device among cells adjacent to a camp cell of the terminal device.

Optionally, a modulation mode of a coded sequence of the target uplink signal is $\pi/2$–BPSK.

Optionally, a time-frequency pattern of the target uplink signal is a target time-frequency pattern.

The target time-frequency pattern is determined by the terminal device based on a comb structure type of the target uplink signal, the number of symbols occupied by the target uplink signal in one slot, and a frequency domain offset between adjacent subcarriers.

Optionally, the target uplink signal includes at least one of an uplink SRS, a PRACH, an UL PRS, or a target signal.

The target signal is a signal defined for uplink positioning in a NR network.

The terminal device provided in this embodiment of the present invention transmits the target uplink signal based on the target transmission pattern, where the target transmission pattern is associated with at least one of the uplink beamforming capability of the terminal device or the number of repeated transmissions of the target uplink signal. In other words, the target transmission pattern may be determined based on the uplink beamforming capability of the terminal device and/or the number of repeated transmissions times of the target uplink signal, and then the terminal device may be configured to transmit the target uplink signal based on the determined target transmission pattern. Therefore, this embodiment of the present invention provides an implementation in which a terminal device can transmit an uplink signal in an NR network system, to resolve a problem of how the terminal device transmits the uplink signal in the NR network system.

When an integrated unit is used, FIG. 9 is a possible schematic structural diagram of another terminal device 900 in the foregoing embodiments. The terminal device 900 includes:

a transmitting unit 91, configured to transmit a target uplink signal to a target cell or a target receiving apparatus through a target beam, where the target beam is a receiving beam of an optimal beam pair for a SSB of the target cell or the target receiving apparatus; or the target beam is a receiving beam of one beam pair in a first beam pair set, and the first beam pair set is a set of beam pairs whose quality is better than a first quality threshold in beam pairs for a SSB of the target cell or the target receiving apparatus; or the target beam is a receiving beam of an optimal beam pair for a CSI-RS of the target cell or the target receiving apparatus; or the target beam is a receiving beam of one beam pair in a second beam pair set, and the second beam pair set is a set of beam pairs whose quality is better than a second quality threshold in beam pairs for a CSI-RS of the target cell or the target receiving apparatus.

Optionally, the target uplink signal includes an uplink signal for uplink positioning.

Optionally, referring to FIG. 9, the terminal device further includes a receiving unit 92 and a processing unit 93.

The receiving unit 92 is configured to receive configuration information from a network side device, where the configuration information is used to indicate that the terminal device transmits a target uplink signal through a receiving beam of an optimal beam pair for an SSB of the target cell or the target receiving apparatus, or a receiving beam of one beam pair in a first beam pair set, or a receiving beam of an optimal beam pair for a CSI-RS of the target cell or the target receiving apparatus, or a receiving beam of one beam pair in a second beam pair set, the first beam pair set is a set of beam pairs whose quality is better than a first quality threshold in beam pairs for the SSB of the target cell or the target receiving apparatus, and the second beam pair set is a set of beam pairs whose quality is better than a second quality threshold in beam pairs for the CSI-RS of the target cell or the target receiving apparatus.

The processing unit 93 is configured to determine the target beam based on the configuration information.

Optionally, a modulation mode of a coded sequence of the target uplink signal is $\pi/2$–BPSK.

Optionally, a time-frequency pattern of the target uplink signal is a target time-frequency pattern.

The target time-frequency pattern is determined by the terminal device based on a comb structure type of the target uplink signal, the number of symbols occupied by the target uplink signal in one slot, and a frequency domain offset between adjacent subcarriers.

Optionally, the target uplink signal includes at least one of an uplink SRS, a PRACH, an UL PRS, or a target signal.

The target signal is a signal defined for uplink positioning in a NR network.

The terminal device provided in this embodiment of the present invention transmits the target uplink signal to the target cell or the target receiving apparatus through the target beam, where the target beam is a receiving beam of an optimal beam pair for a SSB of the target cell or the target receiving apparatus, or the target beam is a receiving beam of one beam pair in a first beam pair set, or the target beam is a receiving beam of an optimal beam pair for a CSI-RS of the target cell or the target receiving apparatus, or the target beam is a receiving beam of one beam pair in a second beam pair set. In other words, the target uplink signal may be transmitted through the receiving beam in the optimal beam pair for the SSB of the target cell or the target receiving apparatus, or the receiving beam of the beam pair whose quality is better than the first quality threshold in the beam pairs for the SSB of the target cell or the target receiving apparatus, or the receiving beam in the optimal beam pair for the CSI-RS of the target cell or the target receiving apparatus, or the receiving beam of the beam pair whose quality is better than the second quality threshold in the beam pairs for the CSI-RS of the target cell or the target receiving apparatus. Therefore, this embodiment of the present invention provides an implementation in which a terminal device can transmit an uplink signal in an NR network system, to resolve a problem of how the terminal device transmits the uplink signal in the NR network system.

When an integrated unit is used, FIG. 9 is a possible schematic structural diagram of another terminal device 900 in the foregoing embodiments. The terminal device 900 includes:

a transmitting unit 91, configured to transmit a target uplink signal, where the target uplink signal is used for uplink positioning, and a modulation mode of a coded sequence of the target uplink signal is $\pi/2$–BPSK.

Optionally, referring to FIG. 9, the terminal device further includes a receiving unit 92 and a processing unit 93.

The receiving unit 92 is configured to receive configuration information from a network side device, where the configuration information is used to indicate that the terminal device performs $\pi/2$–BPSK modulation on the coded sequence of the target uplink signal.

The processing unit 93 is configured to perform $\pi/2$–BPSK modulation on the coded sequence of the target uplink signal based on the configuration information.

Optionally, a time-frequency pattern of the target uplink signal is a target time-frequency pattern.

The target time-frequency pattern is determined by the terminal device based on a comb structure type of the target uplink signal, the number of symbols occupied by the target uplink signal in one slot, and a frequency domain offset between adjacent subcarriers.

Optionally, the target uplink signal includes at least one of an uplink SRS, a PRACH, an UL PRS, or a target signal.

The target signal is a signal defined for uplink positioning in a NR network.

In the foregoing embodiment, the modulation mode of the coded sequence of the target uplink signal that is transmitted by the terminal device and that is used for uplink positioning is $\pi/2$–BPSK, which can make the target uplink signal have better PAPR performance, and is beneficial to hearability of a specific network side receiving device.

When an integrated unit is used, FIG. 9 is a possible schematic structural diagram of another terminal device 900 in the foregoing embodiments. The terminal device 900 includes:

a transmitting unit 91, configured to transmit a target uplink signal, where a time-frequency pattern of the target uplink signal is a target time-frequency pattern, and the target time-frequency pattern is determined by the terminal device based on a comb structure type of the target uplink signal, the number of symbols occupied by the target uplink signal in one slot, and a frequency domain offset between adjacent subcarriers.

Optionally, the target uplink signal includes an uplink signal for uplink positioning.

Optionally, referring to FIG. 9, the terminal device further includes a receiving unit 92 and a processing unit 93.

The receiving unit 92 is configured to receive configuration information from a network side device, where the configuration information includes: a comb structure type of the target uplink signal, the number of symbols occupied by the target uplink signal in one slot, and a frequency domain offset between adjacent subcarriers.

The processing unit 93 is configured to determine the target time-frequency pattern based on the comb structure type of the target uplink signal, the number of symbols occupied by the target uplink signal in one slot, and the frequency domain offset between adjacent subcarriers.

Optionally, the target uplink signal includes at least one of an uplink SRS, a PRACH, an UL PRS, or a target signal.

The target signal is a signal defined for uplink positioning in a NR network.

In this embodiment of the present invention, the terminal device transmits the target uplink signal whose time-frequency pattern is the target time-frequency pattern, where the target time-frequency pattern is determined by the terminal device based on the comb structure type of the target uplink signal, the number of symbols occupied by the target uplink signal in one slot, and the frequency domain offset between adjacent subcarriers. Therefore, this embodiment of the present invention provides an implementation in which a terminal device can transmit an uplink signal in an NR network system, to resolve a problem of how the terminal device transmits the uplink signal in the NR network system.

In some embodiments of the present invention, functional module division may be performed for the terminal device and the like based on the foregoing method examples. For example, functional modules may be obtained through division in one-to-one correspondence with functions, or two or more functions may be integrated into one module. The integrated module may be implemented in a form of hardware, or may be implemented in a form of a software functional module. It should be noted that, the module division in some embodiments of the present invention is an example and is merely logical function division. There may be another division manner in actual implementation.

Figure 10:
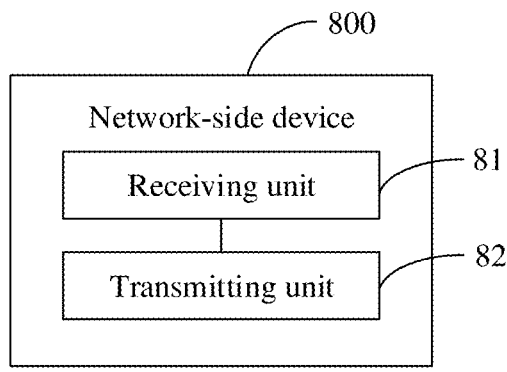
FIG. 10 is a schematic structural diagram of a network side device according to an embodiment of the present invention.

When an integrated unit is used, FIG. 10 is a possible schematic structural diagram of a network side device 800 in the foregoing embodiments. The network side device 800 includes:

a receiving unit 81, configured to receive capability information from a terminal device, where the capability information includes the number of SRS resource sets supported by the terminal device and the number of SRS resources included in one SRS resource set; and a transmitting unit 82, configured to transmit first configuration information or indication information to the terminal device based on the capability information, where the first configuration information includes a target transmission pattern, and is used to indicate that the terminal device configures the target transmission pattern as a transmission pattern for transmitting a target uplink signal, the indication information is used to indicate that the terminal device determines the target transmission pattern in a predefined transmission pattern set as a transmission pattern for transmitting a target uplink signal, and the target transmission pattern is associated with the number of uplink SRS resource sets supported by the terminal device, the number of SRS resources included in one SRS resource set, and the number of repeated transmissions of the target uplink signal.

Optionally, the target uplink signal includes an uplink signal for uplink positioning.

Optionally, the number of repeated transmissions of the target uplink signal is associated with a coverage capability of the network side device.

Optionally, when the terminal device is in an idle state or an inactive state, the transmitting unit 82 is further configured to transmit, before completion of connected state release for the terminal device, second configuration information to the terminal device, where the second configuration information includes a target power, and is used to indicate that the terminal device configures the target power as a transmission power of the target uplink signal.

Optionally, when the terminal device is in an idle state or an inactive state, the transmitting unit 82 is further configured to transmit, before completion of connected state release for the terminal device, third configuration information to the terminal device, where the third configuration information is used to indicate that the terminal device determines a transmission power of the target uplink signal based on a camp cell.

Optionally, when the terminal device is in an idle state or an inactive state, the transmitting unit 82 is further configured to transmit, before completion of connected state release for the terminal device, fourth configuration information to the terminal device, where the fourth configuration information includes a target TA, and the fourth configuration information is used to indicate that the terminal device configures a TA of the target uplink signal as the target TA.

Optionally, the target TA is 0.

Optionally, when the terminal device is in an idle state or an inactive state, the transmitting unit 82 is further configured to transmit, before completion of connected state release for the terminal device, fifth configuration information to the terminal device, where the fifth configuration information is used to indicate that the terminal device determines a timing of a target cell to be a reference timing of the target uplink signal.

The target cell is a camp cell of the terminal device; or the target cell is a cell closest to the terminal device among cells adjacent to a camp cell of the terminal device.

When an integrated unit is used, FIG. 10 is a possible schematic structural diagram of another network side device 800 in the foregoing embodiments. The network side device 800 includes:

a transmitting unit 82, configured to transmit configuration information to a terminal device, where the configuration information is used to indicate that the terminal device transmits a target uplink signal to a target cell or a target receiving apparatus through a target beam; and the target beam is a receiving beam of an optimal beam pair for a SSB of the target cell or the target receiving apparatus; or the target beam is a receiving beam of one beam pair in a first beam pair set, and the first beam pair set is a set of beam pairs whose quality is better than a first quality threshold in beam pairs for a SSB of the target cell or the target receiving apparatus; or the target beam is a receiving beam of an optimal beam pair for a CSI-RS of the target cell or the target receiving apparatus; or the target beam is a receiving beam of one beam pair in a second beam pair set, and the second beam pair set is a set of beam pairs whose quality is better than a second quality threshold in beam pairs for a CSI-RS of the target cell or the target receiving apparatus.

Optionally, the target uplink signal includes an uplink signal for uplink positioning.

When an integrated unit is used, FIG. 10 is a possible schematic structural diagram of another network side device 800 in the foregoing embodiments. The network side device 800 includes:

a transmitting unit 82, configured to transmit configuration information to a terminal device, where the configuration information is used to indicate that the terminal device performs $\pi/2$–BPSK modulation on a coded sequence of a target uplink signal; and the target uplink signal is a signal for uplink positioning.

When an integrated unit is used, FIG. 10 is a possible schematic structural diagram of another network side device 800 in the foregoing embodiments. The network side device 800 includes:

a transmitting unit 82, configured to transmit configuration information to a terminal device, where the configuration information includes a comb structure type of a target uplink signal, the number of symbols occupied by the target uplink signal in one slot, and a frequency domain offset between adjacent subcarriers, and the configuration information is used to indicate that the terminal device determines a time-frequency pattern for transmitting the target uplink signal based on the comb structure type of the target uplink signal, the number of symbols occupied by the target uplink signal in one slot, and the frequency domain offset between adjacent subcarriers.

Optionally, the target uplink signal includes an uplink signal for uplink positioning.

Figure 11:
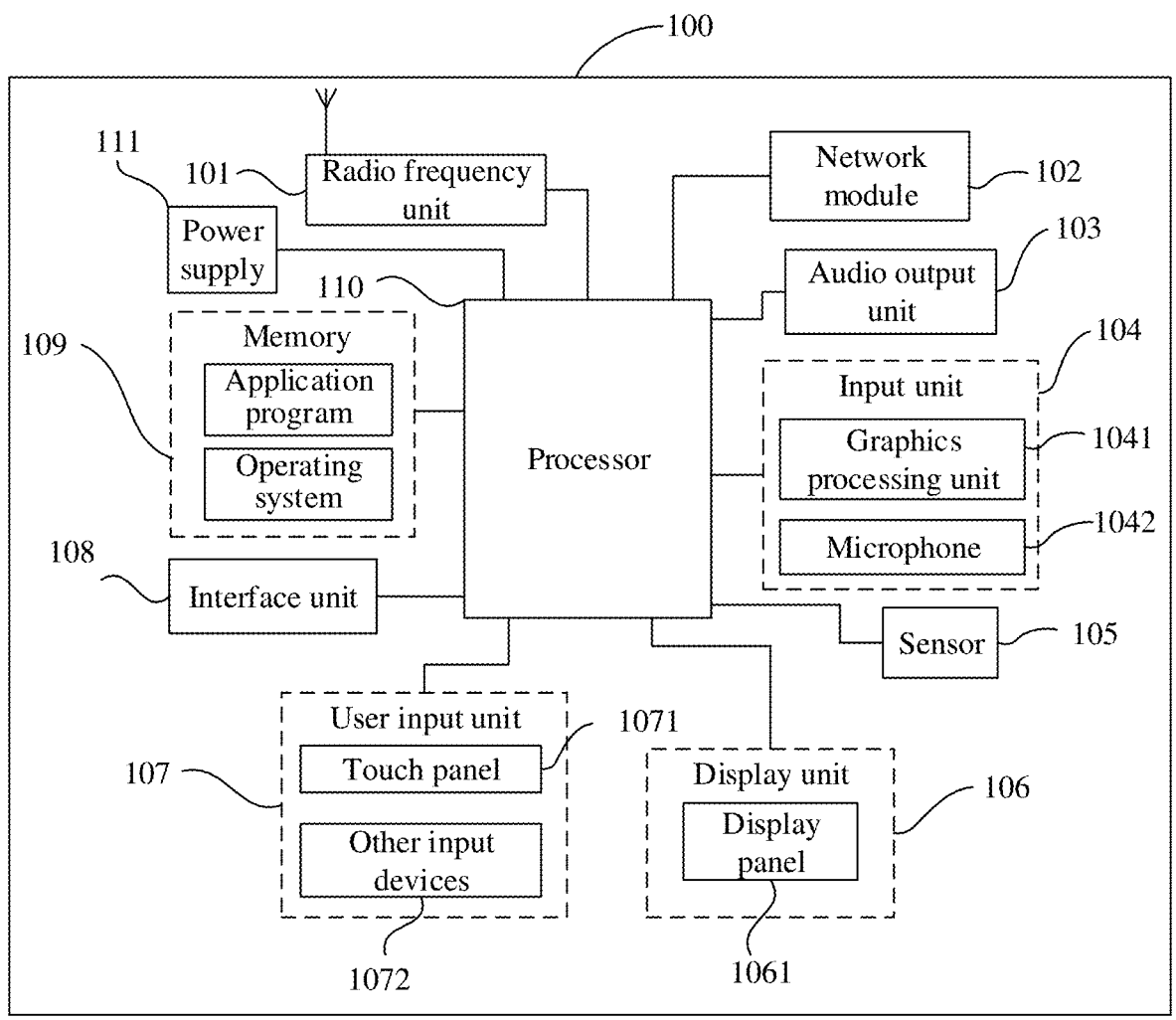
FIG. 11 is a schematic structural diagram of hardware a terminal device according to an embodiment of the present invention.

FIG. 11 is a schematic structural diagram of hardware of a terminal device implementing the embodiments of the present invention. The terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the terminal device is not limited to the terminal device structure shown in FIG. 11. The terminal device may include more or fewer components than those shown in the figure, or combine some of the components, or arrange the components differently. In this embodiment of the present invention, the terminal device includes but is not limited to a mobile phone, a tablet computer, a notebook computer, a palmtop computer, a vehicle-mounted terminal, a wearable device, a pedometer, or the like.

The radio frequency unit 101 is configured to transmit the target uplink signal based on the target transmission pattern, where the target transmission pattern is associated with at least one of an uplink beamforming capability of the terminal device or the number of repeated transmissions of the target uplink signal;

or the radio frequency unit 101 is configured to transmit a target uplink signal to a target cell or a target receiving apparatus through a target beam, where the target beam is a receiving beam of an optimal beam pair for a SSB of the target cell or the target receiving apparatus; or a receiving beam of one beam pair in a first beam pair set, where the first beam pair set is a set of beam pairs whose quality is better than a first quality threshold in beam pairs for the SSB of the target cell or the target receiving apparatus; or a receiving beam of an optimal beam pair for a CSI-RS of the target cell or the target receiving apparatus; or a receiving beam of one beam pair in a second beam pair set, where the second beam pair set is a set of beam pairs whose quality is better than a second quality threshold in beam pairs for the CSI-RS of the target cell or the target receiving apparatus;

or the radio frequency unit 101 is configured to transmit a target uplink signal, where the target uplink signal is used for uplink positioning, and a modulation mode of a coded sequence of the target uplink signal is π/2–BPSK;

or the radio frequency unit 101 is configured to transmit a target uplink signal, where a time-frequency pattern of the target uplink signal is a target time-frequency pattern, and the target time-frequency pattern is determined by the terminal device based on a comb structure type of the target uplink signal, the number of symbols occupied by the target uplink signal in one slot, and a frequency domain offset between adjacent subcarriers.

It should be understood that in this embodiment of the present invention, the radio frequency unit 101 may be configured to receive and transmit signals in an information reception or transmission or call process. For example, after receiving downlink data from a base station, the radio frequency unit 101 transmits the downlink data to the processor 110 for processing, and in addition, transmits uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and other devices via a wireless communications system.

The terminal device provides wireless broadband Internet access for a user by using the network module 102, for example, helps the user transmit and receive e-mails, browse web pages, and access streaming media.

The audio output unit 103 may convert audio data received by the radio frequency unit 101 or the network module 102 or stored in the memory 109 into an audio signal and output the audio signal as a sound. In addition, the audio output unit 103 may further provide audio output (for example, a call signal received sound or a message received sound) that is related to a specific function performed by the terminal device 100. The audio output unit 103 includes a speaker, a buzzer, a receiver, and the like.

The input unit 104 is configured to receive an audio signal or a video signal. The input unit 104 may include a graphics processing unit (GPU) 1041 and a microphone 1042, and the graphics processing unit 1041 processes image data of a still picture or a video obtained by an image capture apparatus (for example, a camera) in an image capture mode or a video capture mode. A processed image frame may be displayed on the display unit 106. The image frame processed by the graphics processing unit 1041 may be stored in the memory 109 (or another storage medium) or transmitted by using the radio frequency unit 101 or the network module 102. The microphone 1042 is capable of receiving sounds and processing such sounds into audio data. The processed audio data can be converted into a format output that can be transmitted to a mobile communication base station through the radio frequency unit 101 in a telephone call mode.

The terminal device 100 further includes at least one sensor 105, for example, an optical sensor, a motion sensor, and other sensors. The optical sensor includes an ambient light sensor and a proximity sensor. The ambient light sensor may adjust brightness of a display panel 1061 based on intensity of ambient light. When the terminal device 100 moves near an ear, the proximity sensor may disable the display panel 1061 and/or backlight. As a type of motion sensor, an accelerometer sensor can detect magnitudes of accelerations in a plurality of directions (usually three axes), can detect the magnitude and direction of gravity when the mobile phone is in a static state, and can be applied to terminal device posture recognition (for example, screen switching between portrait and landscape, related gaming, and magnetometer posture calibration), functions related to vibration recognition (for example, pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided to the user. The display unit 106 may include the display panel 1061. The display panel 1061 may be configured in a form of a liquid crystal display (LCD), an organic light-emitting diode (OLED), or the like.

The user input unit 107 may be configured to receive input digit or character information, and generate key signal input that is related to user setting and function control of the terminal device. The user input unit 107 includes a touch panel 1071 and other input devices 1072. The touch panel 1071, also referred to as a touchscreen, may capture a touch operation performed by a user on or near the touch panel (for example, an operation performed by the user on the touch panel 1071 or near the touch panel 1071 by using a finger or any appropriate object or accessory such as a stylus). The touch panel 1071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 110, receives a command transmitted by the processor 110, and executes the command. In addition, the touch panel 1071 may be implemented in a plurality of forms, for example, as a resistive, capacitive, infrared, or surface acoustic wave touch panel. In addition to the touch panel 1071, the user input unit 107 may further include other input devices 1072. The other input devices 1072 may include but are not limited to a physical keyboard, a function key (such as a volume control key or a switch key), a trackball, a mouse, and a joystick. Details are not described herein.

Optionally, the touch panel 1071 may cover the display panel 1061. When detecting a touch operation on or near the touch panel 1071, the touch panel 1071 transmits the touch operation to the processor 110 to determine a type of a touch event. Then, the processor 110 provides a corresponding visual output on the display panel 1061 based on the type of the touch event. In FIG. 11, the touch panel 1071 and the display panel 1061 serve as two separate components to implement input and output functions of the terminal device. However, in some embodiments, the touch panel 1071 and the display panel 1061 may be integrated to implement the input and output functions of the terminal device. This is not specifically limited herein.

The interface unit 108 is an interface for connecting an external apparatus to the terminal device 100. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 108 may be configured to receive input (for example, data information and electric power) from the external apparatus, and transmit the received input to one or more elements in the terminal device 100; or may be configured to transmit data between the terminal device 100 and the external apparatus.

The memory 109 may be configured to store software programs and various data. The memory 109 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 109 may include a high-speed random access memory, and may further include a non-volatile memory such as a disk storage device, a flash memory device, or another volatile solid-state storage device.

The processor 110 is a control center of the terminal device, uses various interfaces and lines to connect a plurality of parts of the entire terminal device, and performs various functions and data processing of the terminal device by running or executing the software program and/or module stored in the memory 109 and invoking data stored in the memory 109, thereby performing overall monitoring on the terminal device. The processor 110 may include one or more processing units. Optionally, an application processor and a modem processor may be integrated in the processor 110. The application processor primarily processes an operating system, user interfaces, application programs, and the like. The modem processor primarily processes radio communication. It can be understood that the modem processor may alternatively be not integrated in the processor 110.

The terminal device 100 may further include a power supply 111 (for example, a battery) that supplies power to a plurality of components. Optionally, the power supply 111 may be logically connected to the processor 110 by using a power management system, so as to implement functions such as charging management, discharging management, and power consumption management by using the power management system.

In addition, the terminal device 100 includes some functional modules that are not illustrated. Details are not described herein.

Figure 12:
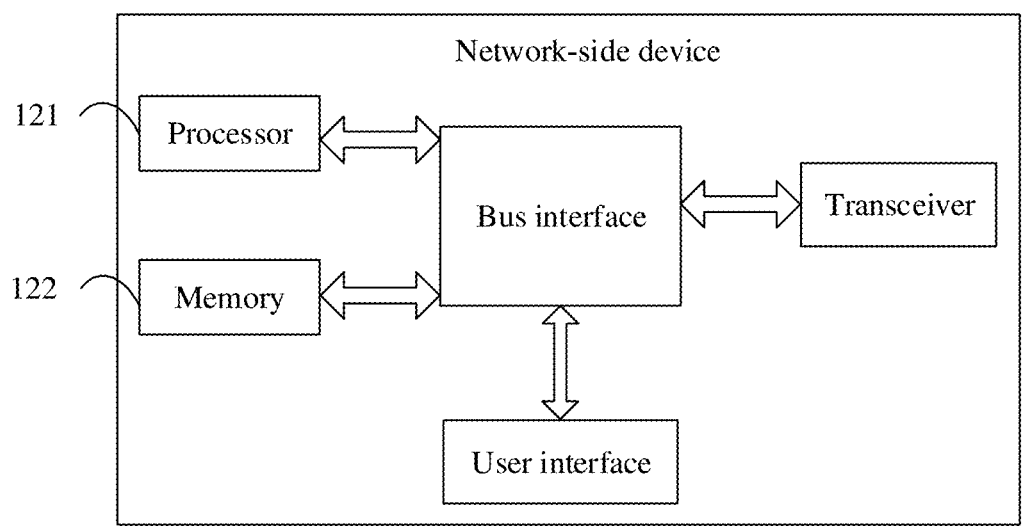
FIG. 12 is a schematic structural diagram of hardware of a network side device according to an embodiment of the present invention.

An embodiment of the present invention further provides a network side device. Referring to FIG. 12, the network side device includes a processor 121, a memory 122, and a computer program stored in the memory 122 and executable on the processor 121. When the computer program is executed by the processor 121, the steps performed by the network side device in the uplink signal transmission method in the foregoing embodiments are implemented, with the same technical effects achieved. To avoid repetition, details are not described herein again.

An embodiment of the present invention further provides a non-transitory computer-readable storage medium. The non-transitory computer-readable storage medium stores a computer program. When the computer program is executed by a processor, the plurality of procedures of the uplink signal transmission method in the foregoing embodiments are implemented, with the same technical effect achieved. To avoid repetition, details are not described herein again. The non-transitory computer-readable storage medium may be a read-only memory (ROM), a random access memory (RAM), a magnetic disc, or an optical disk.

An embodiment of the present invention further provides a non-transitory computer-readable storage medium. The non-transitory computer-readable storage medium stores a computer program. When the computer program is executed by a processor, the plurality of procedures of the uplink signal transmission method embodiment are implemented, with the same technical effect achieved. To avoid repetition, details are not described herein again. The non-transitory computer-readable storage medium is, for example, a ROM, a RAM, a magnetic disc, or an optical disk.

It should be noted that the terms "comprise", "include", or any of their variants in this specification are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software on a necessary universal hardware platform or by hardware only. In most cases, the former is a more preferred implementation. Based on such an understanding, the technical solutions of this application essentially or the part contributing to the prior art may be implemented in a form of a software product. The software product may be stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in a plurality of embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An uplink signal transmission method, wherein the method comprises:
   transmitting, by a terminal device, a target uplink signal based on a target transmission pattern, wherein
   the target transmission pattern is associated with an uplink beamforming capability of the terminal device, or the target transmission pattern is associated with an uplink beamforming capability of the terminal device and the number of repeated transmissions of the target uplink signal;
   wherein the uplink beamforming capability of the terminal device comprises: whether the terminal device supports uplink beamforming, and in a case that the terminal device supports beamforming, the number of uplink sounding reference signal (SRS) resource sets supported by the terminal device, and the number of SRS resources comprised in one SRS resource set; and
   the target transmission pattern comprises N reference signal (RS) resource groups, and each RS resource group comprises M RS resources, wherein N is a product of the number of SRS resource sets supported by the terminal device and the number of SRS resources comprised in one SRS resource set, and M is the number of repeated transmissions of the target uplink signal.

2. The method according to claim 1, wherein the target uplink signal comprises an uplink signal for uplink positioning.

3. The method according to claim 1, wherein before the transmitting, by the terminal device, the target uplink signal based on the target transmission pattern, the method further comprises:

transmitting, by the terminal device, capability information to a network side device, wherein the capability information comprises the number of SRS resource sets supported by the terminal device and the number of SRS resources comprised in one SRS resource set; and receiving, by the terminal device, first configuration information comprising the target transmission pattern from the network side device, and configuring the target transmission pattern as a transmission pattern for transmitting the target uplink signal;

or receiving, by the terminal device, indication information from the network side device, determining the target transmission pattern in a predefined transmission pattern set based on the indication information, and configuring the target transmission pattern as a transmission pattern for transmitting the target uplink signal.

4. The method according to claim 1, wherein in a case that the number of repeated transmissions of the target uplink signal is greater than 1, a transmission sequence of repeated target uplink signal is successive.

5. The method according to claim 1, wherein

M RS resources in one RS resource group correspond to a same transmission beam; and transmission beams corresponding to any two RS resource groups in the target transmission pattern are different, and a transmission beam corresponding to a RS resource group is a transmission beam corresponding to RS resources in the RS resource group.

6. The method according to claim 1, wherein all RS resources in the target transmission pattern have a same transmission power.

7. The method according to claim 1, wherein in a case that the terminal device is in an idle state or an inactive state, the method further comprises:

before completion of connected state release, receiving, by the terminal device, from a network side device, second configuration information comprising a target power, and configuring the target power as a transmission power of the target uplink signal;

or before completion of connected state release, receiving, by the terminal device, third configuration information from a network side device, and determining a transmission power of the target uplink signal based on a camp cell, wherein the third configuration information is used to indicate that the terminal device determines the transmission power of the target uplink signal based on the camp cell;

or before completion of connected state release, receiving, by the terminal device, fourth configuration information from a network side device, wherein the fourth configuration information comprises a target timing advance (TA); and configuring, by the terminal device, a TA of the target uplink signal as the target TA;

or before completion of connected state release, receiving, by the terminal device, fifth configuration information from a network side device, wherein the fifth configuration information is used to indicate that the terminal device determines a timing of a target cell to be a reference timing of the target uplink signal; and determining, by the terminal device, the timing of the target cell to be the reference timing of the target uplink signal, wherein the target cell is a camp cell of the terminal device; or the target cell is a cell closest to the terminal device among cells adjacent to a camp cell of the terminal device.

8. The method according to claim 7, wherein the target TA is 0.

9. The method according to claim 1, wherein a modulation mode of a coded sequence of the target uplink signal is $\pi/2$-BPSK.

10. The method according to claim 1, wherein a time-frequency pattern of the target uplink signal is a target time-frequency pattern; and the target time-frequency pattern is determined by the terminal device based on a comb structure type of the target uplink signal, the number of symbols occupied by the target uplink signal in one slot, and a frequency domain offset between adjacent subcarriers.

11. The method according to claim 1, wherein the target uplink signal comprises an uplink sounding reference signal (SRS), a physical random access channel (PRACH), an uplink positioning reference signal (UL PRS), or a target signal, wherein the target signal is a signal defined for uplink positioning in a new radio (NR) network.

12. A terminal device, comprising a processor, a memory, and a computer program stored in the memory and executable on the processor, wherein the computer program, when executed by the processor, causes the terminal device to perform:

transmitting a target uplink signal based on a target transmission pattern, wherein the target transmission pattern is associated with an uplink beamforming capability of the terminal device, or the target transmission pattern is associated with an uplink beamforming capability of the terminal device and the number of repeated transmissions of the target uplink signal;

wherein the uplink beamforming capability of the terminal device comprises: whether the terminal device supports uplink beamforming, and in a case that the terminal device supports beamforming, the number of uplink sounding reference signal (SRS) resource sets supported by the terminal device, and the number of SRS resources comprised in one SRS resource set; and the target transmission pattern comprises N reference signal (RS) resource groups, and each RS resource group comprises M RS resources, wherein N is a product of the number of SRS resource sets supported by the terminal device and the number of SRS resources comprised in one SRS resource set, and M is the number of repeated transmissions of the target uplink signal.

13. The terminal device according to claim 12, wherein the target uplink signal comprises an uplink signal for uplink positioning.

14. The terminal device according to claim 12, wherein the computer program, when executed by the processor, causes the terminal device to further perform:
transmitting capability information to a network side device, wherein the capability information comprises the number of SRS resource sets supported by the terminal device and the number of SRS resources comprised in one SRS resource set; and
receiving first configuration information comprising the target transmission pattern from the network side device, and configuring the target transmission pattern as a transmission pattern for transmitting the target uplink signal;
or
receiving indication information from the network side device, determining the target transmission pattern in a predefined transmission pattern set based on the indication information, and configuring the target transmission pattern as a transmission pattern for transmitting the target uplink signal.

15. The terminal device according to claim 12, wherein in a case that the number of repeated transmissions of the target uplink signal is greater than 1, a transmission sequence of repeated target uplink signal is successive.

16. The terminal device according to claim 12, wherein M RS resources in one RS resource group correspond to a same transmission beam; and
transmission beams corresponding to any two RS resource groups in the target transmission pattern are different, and a transmission beam corresponding to a RS resource group is a transmission beam corresponding to RS resources in the RS resource group.

17. The terminal device according to claim 12, wherein all RS resources in the target transmission pattern have a same transmission power.

18. The terminal device according to claim 12, wherein in a case that the terminal device is in an idle state or an inactive state, the computer program, when executed by the processor, causes the terminal device to further perform:
before completion of connected state release, receiving from a network side device, second configuration information comprising a target power, and configuring the target power as a transmission power of the target uplink signal;
or
before completion of connected state release, receiving third configuration information from a network side device, and determining a transmission power of the target uplink signal based on a camp cell, wherein the third configuration information is used to indicate that the terminal device determines the transmission power of the target uplink signal based on the camp cell;
or
before completion of connected state release, receiving fourth configuration information from a network side device, wherein the fourth configuration information comprises a target timing advance (TA); and
configuring a TA of the target uplink signal as the target TA;
or
before completion of connected state release, receiving fifth configuration information from a network side device, wherein the fifth configuration information is used to indicate that the terminal device determines a timing of a target cell to be a reference timing of the target uplink signal; and
determining the timing of the target cell to be the reference timing of the target uplink signal, wherein
the target cell is a camp cell of the terminal device; or the target cell is a cell closest to the terminal device among cells adjacent to a camp cell of the terminal device.

19. The terminal device according to claim 12, wherein a modulation mode of a coded sequence of the target uplink signal is $\pi/2$–BPSK.

20. A non-transitory computer-readable storage medium, wherein the non-transitory computer-readable storage medium stores a computer program, and the computer program, when executed by a processor of a terminal device, causes the terminal device to perform:
transmitting a target uplink signal based on a target transmission pattern, wherein
the target transmission pattern is associated with an uplink beamforming capability of the terminal device, or the target transmission pattern is associated with an uplink beamforming capability of the terminal device and the number of repeated transmissions of the target uplink signal;
wherein the uplink beamforming capability of the terminal device comprises: whether the terminal device supports uplink beamforming, and in a case that the terminal device supports beamforming, the number of uplink sounding reference signal (SRS) resource sets supported by the terminal device, and the number of SRS resources comprised in one SRS resource set; and
the target transmission pattern comprises N reference signal (RS) resource groups, and each RS resource group comprises M RS resources, wherein N is a product of the number of SRS resource sets supported by the terminal device and the number of SRS resources comprised in one SRS resource set, and M is the number of repeated transmissions of the target uplink signal.

* * * * *